US012766769B2

(12) United States Patent
Schneider et al.

(10) Patent No.: US 12,766,769 B2
(45) Date of Patent: Oct. 20, 2026

(54) ONE-PIECE WEIGHING FUNNEL MOLDING APPARATUS AND PROCESS

(71) Applicant: TWD Scientific LLC, Pleasant Prairie, WI (US)

(72) Inventors: Jinghua Schneider, Wadsworth, IL (US); Xiaogang Dou, Changzhou (CN); Xinyang Zhao, Changzhou (CN)

(73) Assignee: TWD Scientific LLC, Pleasant Prairie, WI (US)

( * ) Notice: Subject to any disclaimer, the term of this patent is extended or adjusted under 35 U.S.C. 154(b) by 327 days.

(21) Appl. No.: 18/545,031

(22) Filed: Dec. 19, 2023

(65) Prior Publication Data

US 2025/0114992 A1 Apr. 10, 2025

Related U.S. Application Data

(60) Provisional application No. 63/542,348, filed on Oct. 4, 2023.

(51) Int. Cl.

| | |
|---|---|
| ***B29C 45/26*** | (2006.01) |
| ***B29C 45/20*** | (2006.01) |
| ***B29C 45/42*** | (2006.01) |
| *B29L 31/00* | (2006.01) |

(52) U.S. Cl.
CPC .......... *B29C 45/2628* (2013.01); *B29C 45/20* (2013.01); *B29C 45/42* (2013.01); *B29C 2045/2683* (2013.01); *B29C 2045/4266* (2013.01); *B29L 2031/752* (2013.01); *B29L 2031/7724* (2013.01)

(58) Field of Classification Search
CPC ..... B29C 33/44; B29C 33/442; B29C 33/446; B29C 33/48; B29C 33/485; B29C 45/20; B29C 45/231; B29C 45/26; B29C 45/28; B29C 45/2806
See application file for complete search history.

(56) References Cited

U.S. PATENT DOCUMENTS

| | | | |
|---|---|---|---|
| 426,165 | A | 4/1890 | Brittin |
| 1,644,837 | A | 10/1927 | Johnson |
| 5,092,471 | A | 3/1992 | Pinizzotto et al. |
| 5,168,908 | A | 12/1992 | Boyum |
| 5,488,979 | A | 2/1996 | McKenzie |
| 6,179,022 | B1 | 1/2001 | Schneider et al. |

(Continued)

*Primary Examiner* — Thu Khanh T. Nguyen
(74) *Attorney, Agent, or Firm* — Banner & Witcoff, Ltd.

(57) ABSTRACT

An improved molding process for molding weighing funnels. The molding process involves forming one or more mold cavities wherein each mold cavity comprises an upper cavity portion in an upper mold section and a lower cavity portion in a lower mold section. A two piece core comprising an upper core and lower core are positioned in close proximity to one another. The lower molding section is moved upward to place it in close proximity to the upper molding section to form a mold cavity while the lower core is simultaneously moved into the mold cavity into close proximity with the upper core. Plastic is injected into the mold cavity using hot runner technology to form a weighing funnel. After the weighing funnel is formed, the lower molding section is moved downward while the lower core is simultaneously retracted from the mold cavity. A robotic arm is used to remove finished product from the mold.

11 Claims, 7 Drawing Sheets

(56) References Cited

U.S. PATENT DOCUMENTS

| | | | | |
|---|---|---|---|---|
| 2009/0297648 | A1 * | 12/2009 | Sicilia | B29C 49/6427 425/552 |
| 2014/0145372 | A1 * | 5/2014 | Ueno | B29C 45/33 264/328.1 |
| 2019/0217514 | A1 * | 7/2019 | Waizenauer | B29C 45/281 |

* cited by examiner

ONE-PIECE WEIGHING FUNNEL MOLDING APPARATUS AND PROCESS

CROSS-REFERENCE TO RELATED APPLICATION

This application is a non-provisional of, and claims priority to, U.S. Provisional Application No. 63/542,348, filed Oct. 4, 2023, which prior application is incorporated by reference herein in its entirety.

TECHNICAL FIELD

The invention relates to the general field of injection molding, and in particular, an improved mold apparatus and process for molding a weighing funnel

BACKGROUND

U.S. Pat. No. 6,179,022 discloses a one-piece weighing funnel and method for molding a weighing funnel. The molding process utilizes two horizontally spaced-apart opposed cavity blocks with each block fixed to a slidable base portion. The slidable base portions move along a diagonal guide rod such that the cavity blocks move upward and inwardly towards each other until engagement. The cavity blocks when engaged form the outer surface of the weighing funnel. The molding apparatus and process include a core formed of two opposing parts. Each opposing core part is fixed to a block that slides in the vertical direction until the opposing core parts engage. The two opposing core parts once engaged form the internal surfaces of the weighing funnel. Once the cavity blocks and core parts are engaged, plastic is injected into the cavity through an injection port near the uppermost portion of the molding apparatus. After the molding is completed, the opposing core parts disengaged by movement of the blocks to which they are affixed moving in a downward direction. The cavity blocks disengage by the sliding apart from one another.

The molding process and apparatus described in U.S. Pat. No. 6,179,022 suffers from numerous drawbacks. The process and apparatus produce one product per mold cycle and each mold cycle typically lasts about twenty seconds. The process also required intensive labor. An operator must manually release the weighing funnel from an opposing core part and remove it. The molding process inefficiently used material and increased labor costs because an operator removed excess material using a sharp tool. The manual products steps added an additional two to ten seconds to each product cycle, leaving an overall process cycle per product of about 22-30 seconds.

BRIEF SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of this invention may relate to an improved molding apparatus for molding a weighing funnel. The apparatus comprises: (a) a fixed upper section including one or more guide holes, (b) a mold cavity in the upper section to form the outer bottom shape of a weighing funnel, (c) a hot runner control device connected to the fixed section, (d) a sliding bar positioned in the one or more guide holes, (e) a lower section movable upwards towards the upper section, (f) a mold cavity in the lower section to form the outer upper shape of a weighing funnel, (g) an upper core positioned between the upper and lower sections to form the lower interior shape of a weighing funnel, (h) a movable lower core positioned below the fixed core to form the upper interior shape of a weighing funnel, and (i) a robotic arm for removing molded weighing funnels formed using the apparatus. The upper section preferably includes a plurality of upper mold cavities and the lower section preferably includes a plurality of lower mold cavities.

Other aspects of this disclosure may relate to an improved method of molding a weighing funnel comprising: (a) providing a fixed upper section wherein said upper section includes an upper mold cavity sized and configured to form the outer bottom shape of a weighing funnel, (b) providing a movable lower section, wherein the lower section includes a lower mold cavity sized and configured to form the outer upper shape of a weighing funnel, (c) positioning a an upper core between the upper and lower sections wherein the upper core is sized and configured to form the lower interior shape of a weighing funnel, (d) positioning a movable lower core below the upper core, (e) moving the lower section upwards to engage the upper section, (f) moving the lower core into engagement with the upper core, (g) injecting plastic into the cavity formed by the upper mold cavity and lower mold cavity, (h) forming a weighing funnel, (i) moving the lower section downwards while moving the moveable core out of the cavity to release the weighing funnel, (j) removing the molded weighing funnels using a robotic arm. The upper section preferably includes a plurality of mold cavities so that multiple products may be molded simultaneously. The lower section preferably includes a plurality of mold cavities so that multiple products may be molded simultaneously.

The improved apparatus and process have many advantages over the prior art. The improved process reduces the product cycle time from approximately 22-32 seconds to about six seconds. The mold design and process also allow for multiple weighing funnels to be produced each cycle, which further increases the productivity over prior processes. The new process eliminates the need for an operator to manually remove finished product from the mold and potential operator injury. The improved process and its use of hot runner technology eliminates material waste and the need to remove excess material by hand material. The improved design also reduces the number of moving components used in the molding process which increases the longevity of the molding equipment and aids in reducing the product cycle time. In general, the new apparatus and process improves product quality and product cleanliness.

DESCRIPTION OF THE DRAWINGS

To allow for a fuller understanding of the present disclosure, it will now be described by way of example, with reference to the accompanying images and drawings in which.

DETAILED DESCRIPTION

Figure 1:
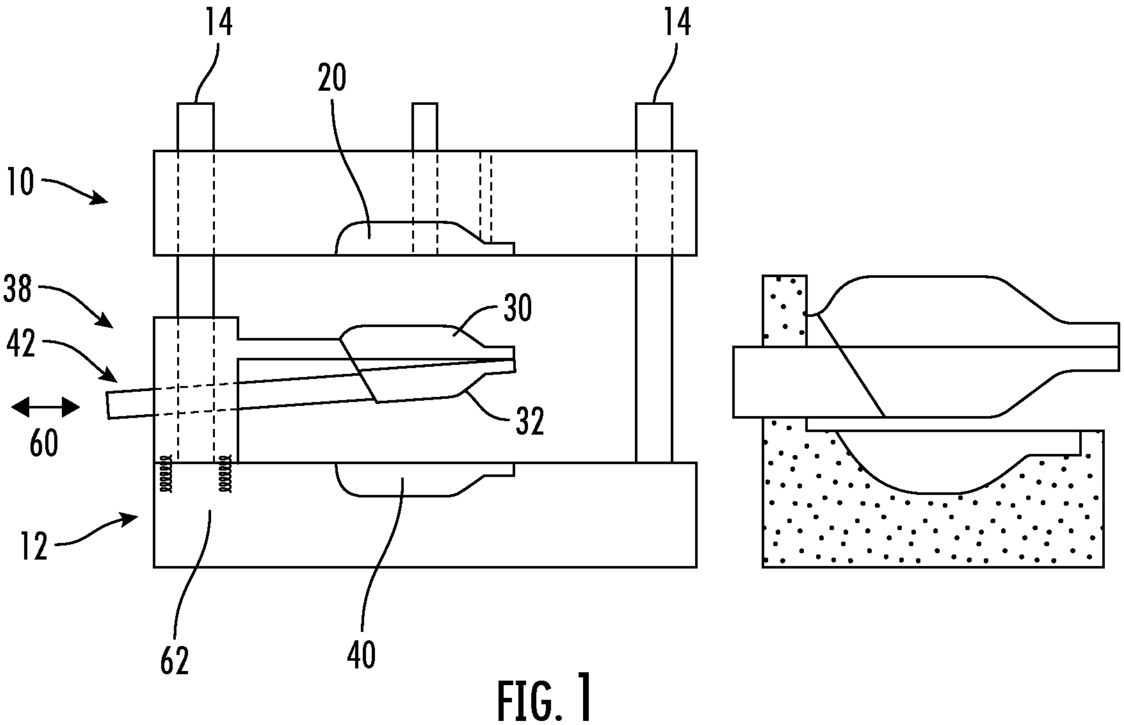
FIG. 1 illustrates a side-view of the molding apparatus, in accordance with aspects of this disclosure.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

Also, while the terms “upper,” “lower,” and the like may be used in this specification to describe various example features and elements of the invention, these terms are used herein as a matter of convenience, e.g., based on the example orientations shown in the figures or the orientation during typical use. Nothing in this specification should be construed as requiring a specific three-dimensional orientation of structures in order to fall within the scope of this invention. Also, the reader is advised that the attached drawings are not necessarily drawn to scale.

In general, this disclosure relates to a molding apparatus and process used to mold plastic weighing funnels. Molding weighing funnels presents a challenge for injection molding because a weighing funnel has an opening that is smaller than the inner cavity. This poses a challenge for how to release a mold core from an opening that is smaller than the core. Applicant has developed an improved apparatus and molding process that provides for increased productivity and improved product quality.

Referring to FIG. 1, the molding apparatus includes an upper mold section 10 and a lower mold section 12, an upper core 30, a lower movable core 32, and pulling mechanism 42 operably connected to the lower movable core 32.

Figure 2:
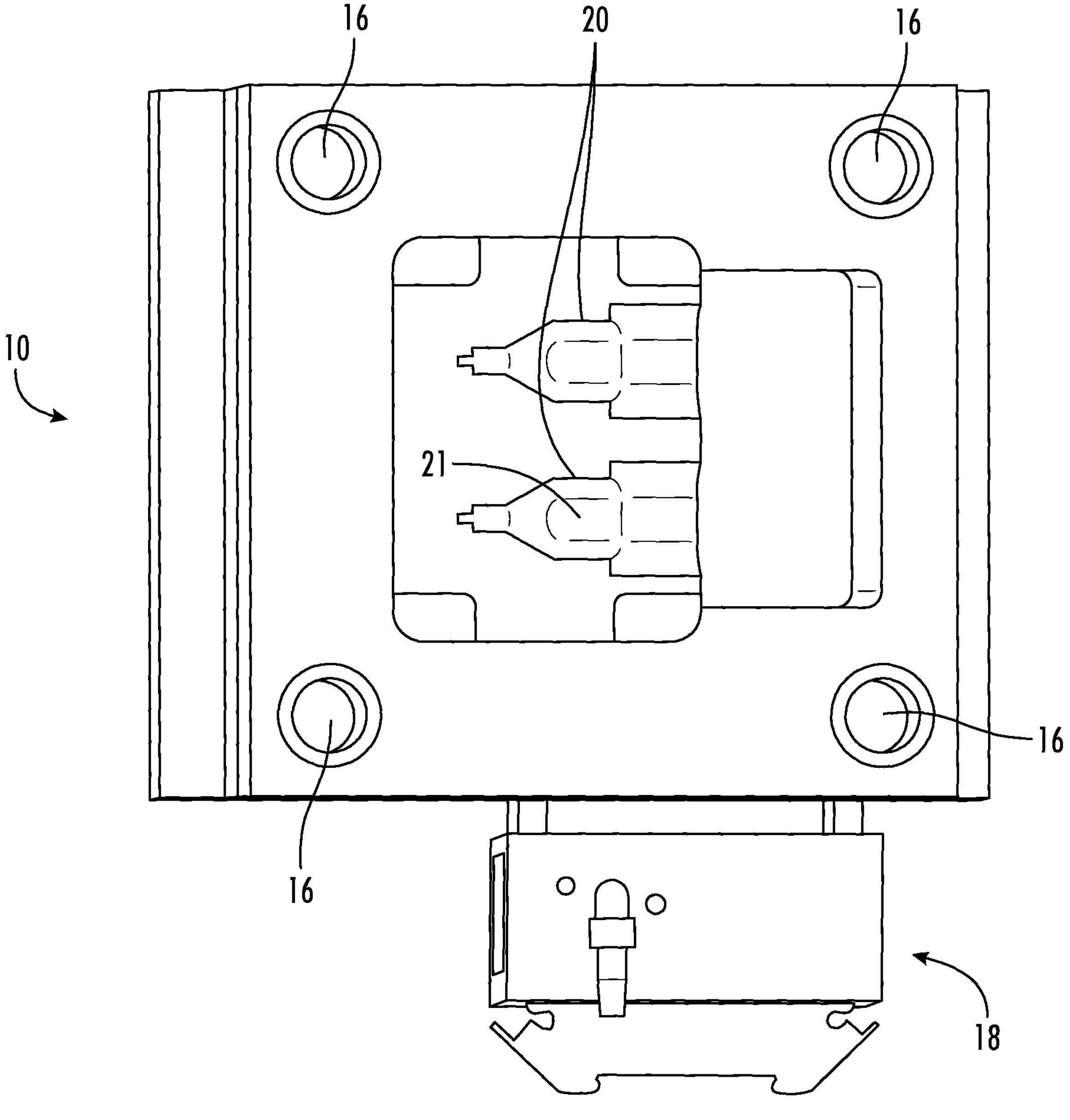
FIG. 2 illustrates a bottom view of the upper section of the molding apparatus of FIG. 1.
Figure 3:
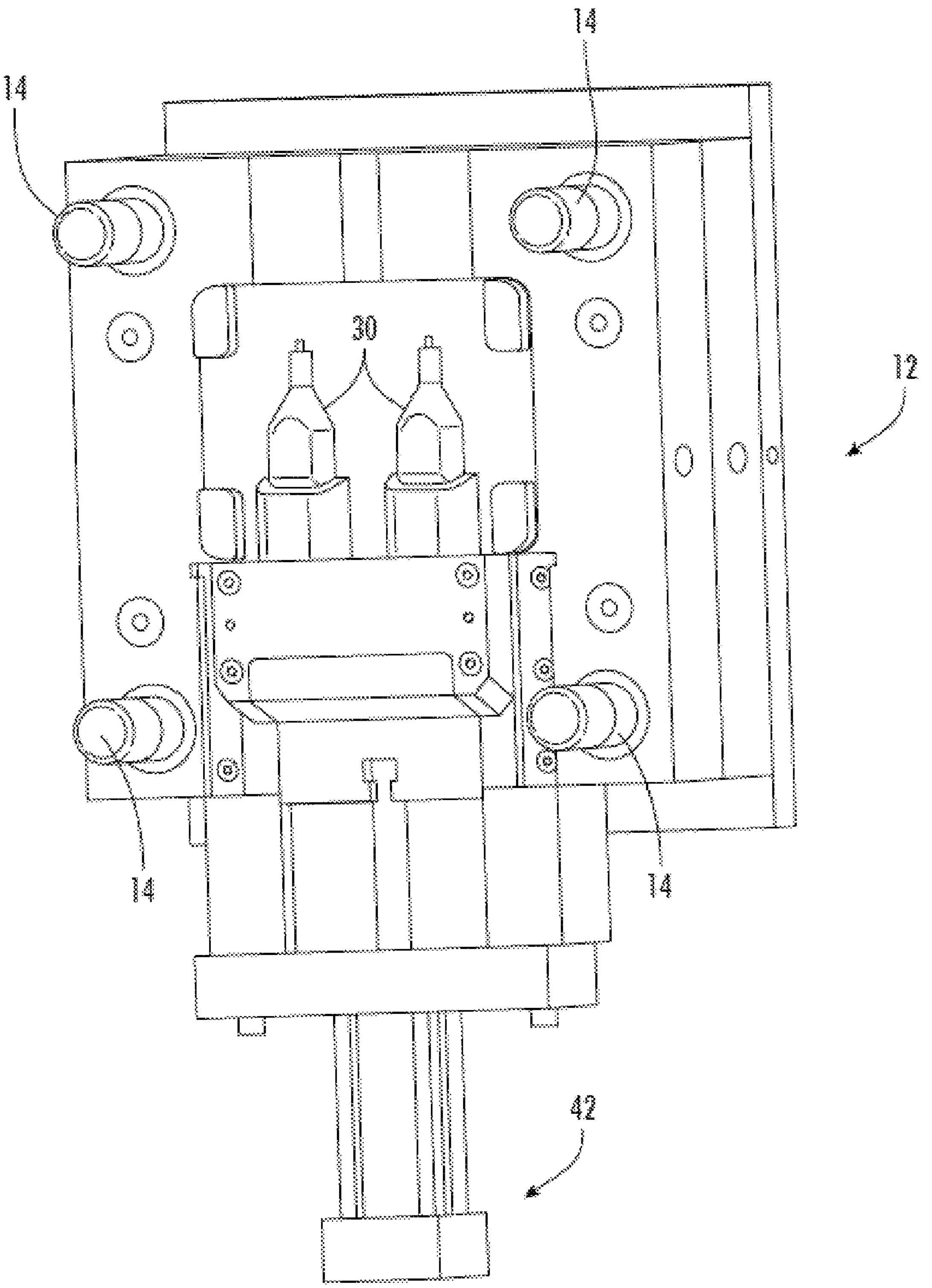
FIG. 3 illustrates a top view of the lower movable section of the molding apparatus of FIG. 1, in accordance with aspects of this disclosure.
Figure 4:
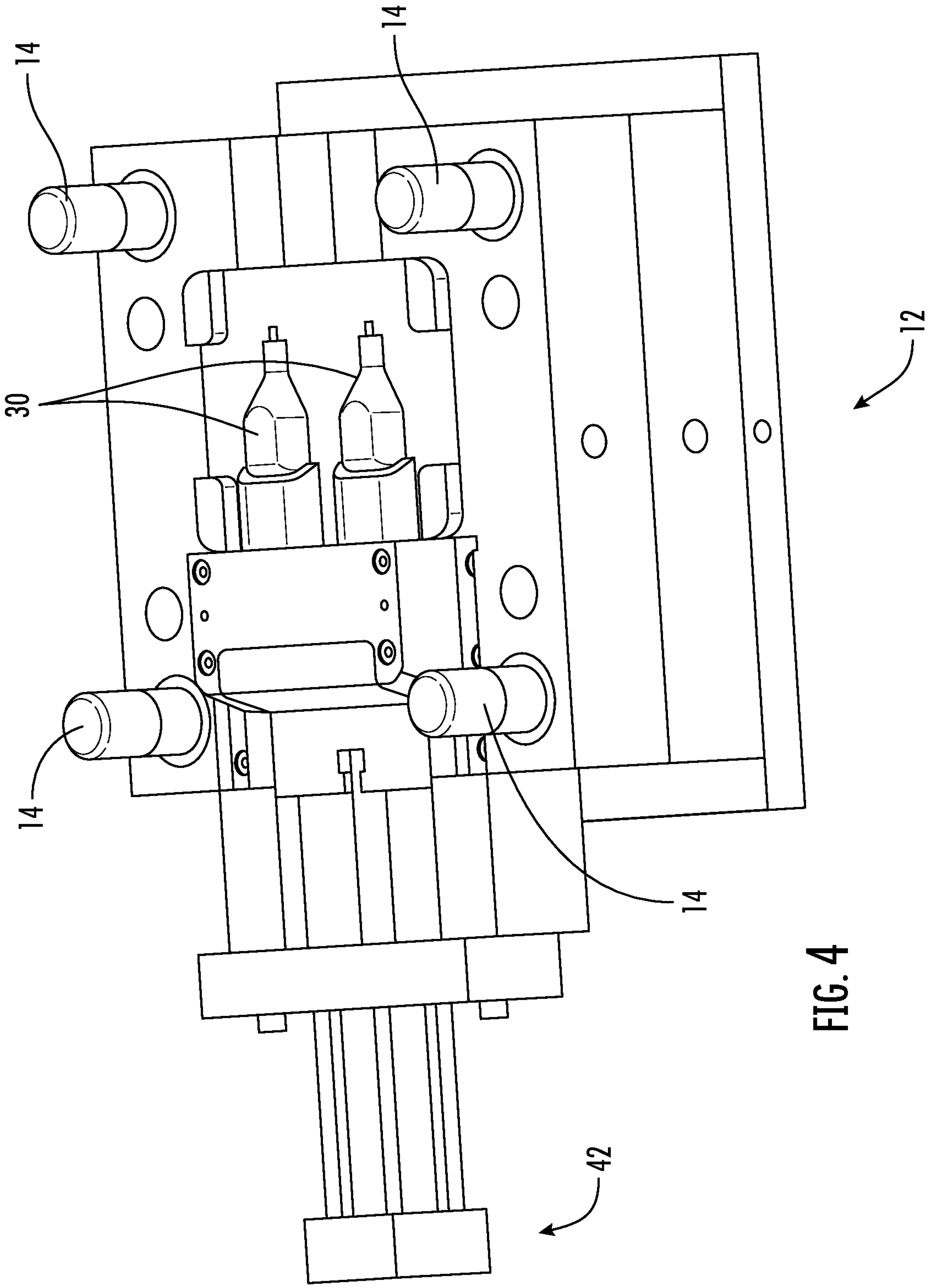
FIG. 4 is a top view of the lower movable section of the molding apparatus of FIG. 1 in accordance with aspects of this disclosure.

Upper section 10 is preferably rectangularly shaped. Upper section 10 includes at least one guide hole 16 for receiving a sliding bar 14. Most preferably, upper section 10 includes four guide holes 16 as shown in FIG. 2. Upper section 10 includes an upper mold cavity 20 sized and configured to form the outer bottom shape of a weighing funnel. Preferably, upper section 10 includes at least two upper mold cavities 20. Preferably, the uppermost portion of the upper mold cavity 20 preferably includes a flat surface 21. By including a flat surface 21 near the uppermost portion of the upper mold cavity 20, the finished product will include a flat surface that may be utilized by a robotic arm to remove a finished product from the mold. Preferably, upper section 10 is to sliding bar 14 such that movement of the upper section 10 along the vertical axis of sliding bar 14 is minimized. Most preferably, upper section 10 is fixed so that it does not move along the vertical axis of sliding bar 14.

Figure 6:
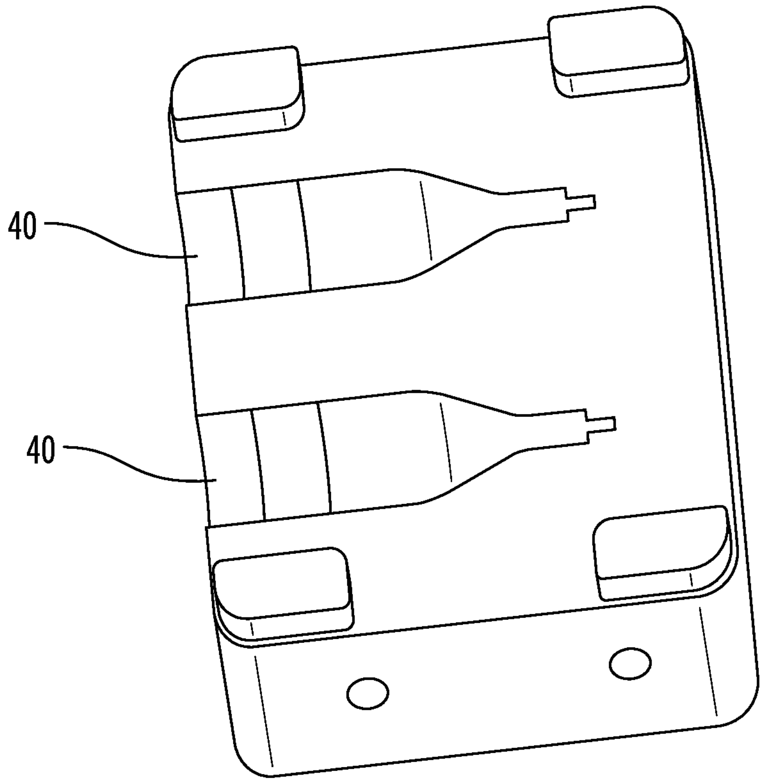
FIG. 6 illustrate the mold cavity in the lower section for forming the upper portion of the product, in accordance with aspects of this disclosure.

As shown in FIGS. 1 and 6, lower section 12 includes a lower mold cavity 40 sized and configured to form the outer upper shape of a weighing funnel. Preferably, lower section 12 includes at least two lower mold cavities 40 as shown in FIG. 6. Lower section 12 includes one or more guide holes for receiving sliding bars 14. Lower section 12 is movable along a vertical axis defined by the sliding bars 14 in a direction towards or away from upper section 10. The lower section 12 may be moved upward into working engagement with upper section 10 such that upper mold cavity 20 and lower mold cavity 40 mate to form a product mold cavity. Preferably, support 38 is operably connected to lower section 12.

As shown in FIG. 2, upper section 10 is connected to a needle valve hot runner system 18 that injects plastic material into the product mold cavity formed by the upper mold cavity 20 and lower mold cavity 40. Suitable plastics for the weighing tunnel include polypropylene, polyethylene, and polystyrene.

Figure 5:
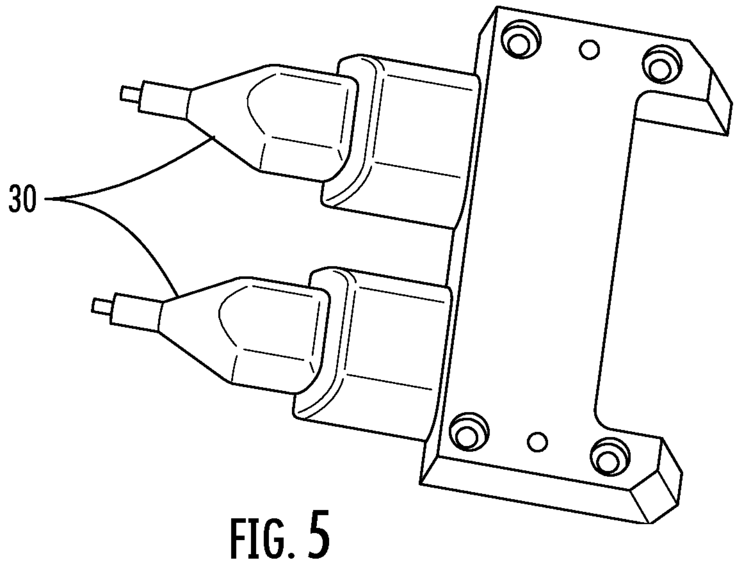
FIG. 5 is a perspective view of the fixed core of the molding apparatus of FIG. 1, in accordance with aspects of this disclosure.
Figure 7:
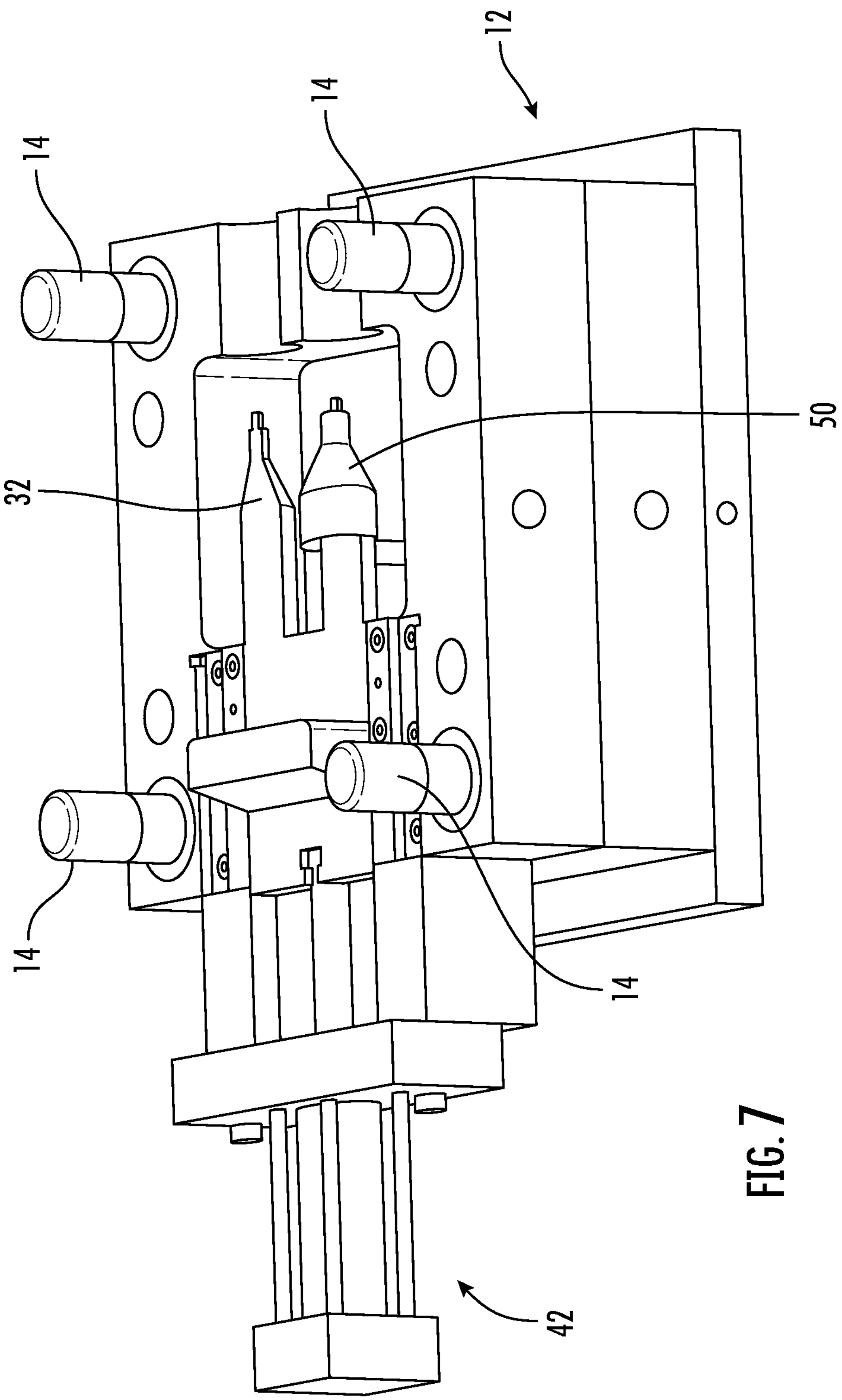
FIG. 7 illustrates the movable core of the molding apparatus of FIG. 1, in accordance with aspects of this disclosure.

As shown in FIG. 1, the present invention utilizes a two piece core for each molded funnel piece. As best shown in FIG. 5, upper core 30 is sized and configured to form the interior surface of the lower portion of a weighing funnel. Preferably, upper core 30 is fixed to support 38 and the upper core 30 is movable only in the vertical direction along the axis defined by the sliding bars 14. As best shown in FIG. 7, the lower core 32 is sized and configured to form the interior surface of the upper portion of a weighing funnel. A finished product 50 is also shown in FIG. 7. Upper core 30 and lower core 32 are operationally connected to support 38 and lower section 12 such that upper core 30 and lower core 32 are positioned within upper mold cavity 20 and lower mold cavity 40 when plastic is injected into the mold.

Lower core 32 is connected to a pulling mechanism 42 which allows the lower core to be moved in an inward or outward direction (i.e. horizontal) generally perpendicular to the vertical axis defined by sliding bars 14. The direction of movement of pulling mechanism 42 is shown by arrow 60 in FIG. 1. During molding, the pulling mechanism is moved inward (to the right in FIG. 1) such that the lower core 32 is brought into working relationship with the upper core 30. Moving the pulling mechanism 42 outward away from the product mold cavity causes the lower core 32 to release from a molded weighing funnel. The pulling mechanism may include one or more rods, shafts, or like structure attached to a support connected that is connected to the lower core that facilitates the movement of the lower core in a direction towards (into) and/or away from (out of) the mold cavity. The pulling mechanism preferably facilitates movement of the lower core so that the lower core may move completely out of the mold cavity. Movement of a portion of the lower core out of the mold cavity is also within the scope of the invention.

The new apparatus may be used to improve the method of manufacturing weighing funnels. The molding process comprises (a) forming a plurality of mold cavities, wherein each mold cavity comprises an upper cavity in an upper mold section and a lower cavity in a lower mold section, (b) positioning, within each mold cavity, a lower core in operational proximity with an upper core, (c) injecting plastic into the mold cavity through a needle valve hot runner, (e)

molding a plurality of weighing funnels, (f) moving the lower mold section downward, (g) removing each lower core from the weighing funnels, and (h) removing each weighing funnel from the mold using a robotic arm. Preferably, the lower mold section and the upper core move into molding position simultaneously, Preferably, the lower mold section moves downward at the same time the lower core is removed from the weighing funnel. Preferably, the robotic arm 62 removes finished products at the same time the lower mold section moves downward and the lower core is removed. As shown in FIG. 1, the apparatus includes one or more springs 62 positioned between support 38 and lower section 12. Most preferably, the apparatus includes four springs 62, positioned adjacent the corners of support 38. The springs assist in biasing the lower section 12 away from support 38, resulting in the finished product to be moved a few millimeters out of cavity 40 for easier removal by robotic arm 62.

Figure 8:
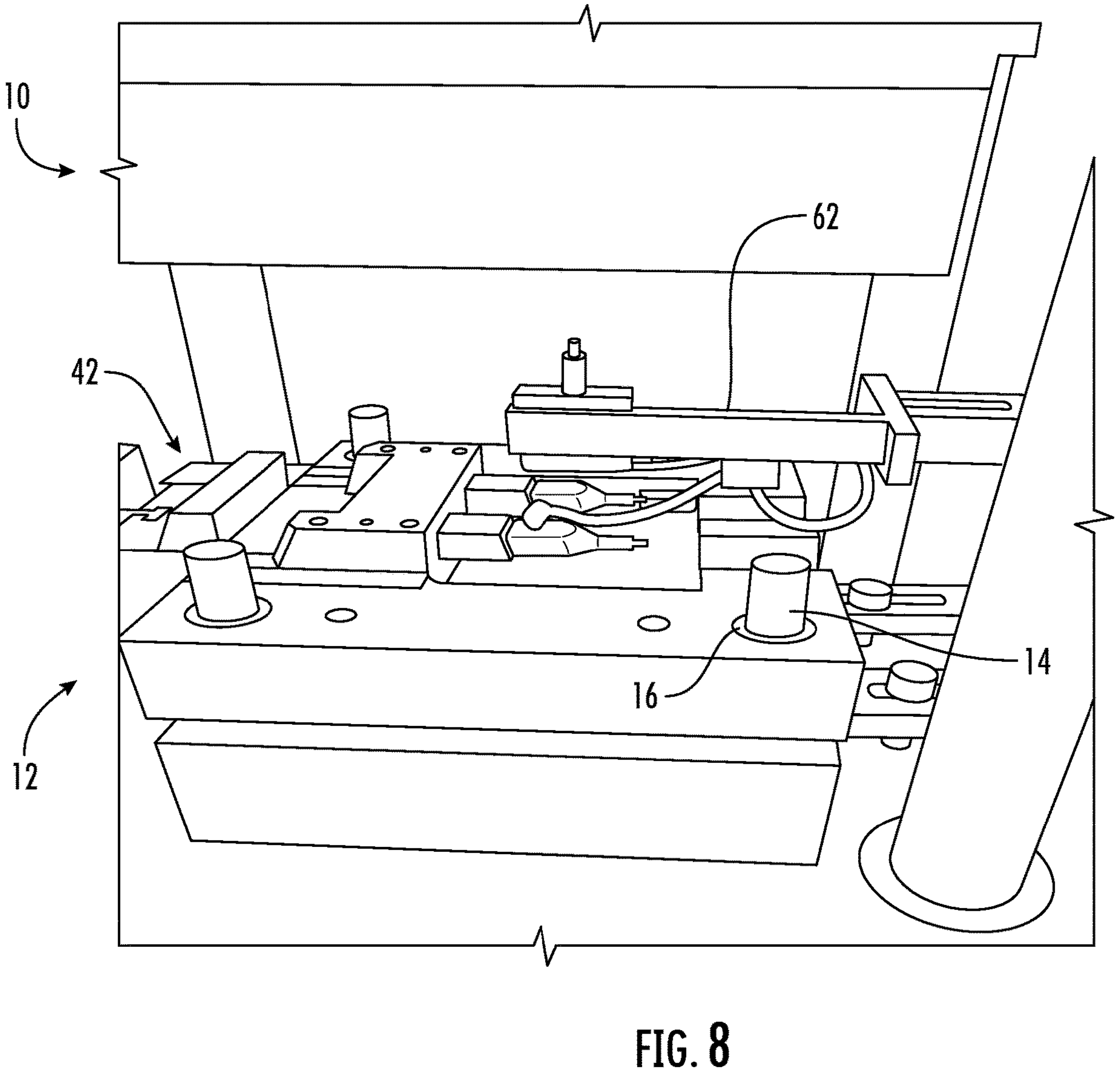
FIG. 8 illustrates the molding apparatus of FIG. 1, in accordance with aspects of this disclosure.

FIG. 8 illustrates a robotic arm 62 that may be utilized in the invention to remove molded weighing funnels from the apparatus. Preferably, the robotic arm 62 includes suction cups (not shown) that engage a flat surface of each weighing funnel to remove the product from the mold and place it in bin. By using the improved process, the molding process is fully automated and the need for an operator is eliminated, or greatly reduced.

It is also understood that the systems, methods, and machines described herein may be constructed with similar structural and functional elements having different configurations, including different ornamental appearances. Still other benefits may be recognized by those skilled in the art. Accordingly, while the specific embodiments have been illustrated and described, numerous modifications come to mind without significantly departing from the spirit of the invention and the scope of protection is only limited by the scope of the accompanying claims.

What is claimed is:

1. A method for molding a weighing funnel comprising:
forming a plurality of mold cavities, wherein each mold cavity comprises an upper cavity portion in an upper mold section and a lower cavity portion in a lower mold section,
positioning, within each mold cavity, an upper core and a lower core,
injecting plastic into the mold cavities,
molding a plurality of weighing funnels,
moving the lower mold section downward,
retracting each lower core from the mold cavity, and
removing each weighing funnel using a robotic arm.

2. The method of claim 1 wherein the upper cavity portion includes a flat surface near the uppermost portion of the upper cavity.

3. The method of claim 1 wherein moving the lower mold section downward and retracting each lower core from the mold cavity happens simultaneously.

4. The method of claim 1 wherein the robotic arm includes suction cups.

5. The method of claim 1 wherein a needle valve hot runner system is used to inject plastic into the mold cavities.

6. The method of claim 1 wherein the lower core is operatively connected to a pulling mechanism that facilitates movement of the lower core relative to the interior of the mold cavity.

7. The method of claim 1 wherein the upper core is fixed to a support and moveable only in a vertical direction between the upper mold section and lower mold section.

8. A method for molding a weighing funnel comprising:
moving an upper mold section having at least two upper mold cavities in a downward direction toward a lower mold section having at least two lower mold cavities;
moving the lower mold section in an upward direction toward said upper mold section,
forming a plurality of mold cavities, wherein each mold cavity comprises an upper cavity portion in an upper mold section and a lower cavity portion in a lower mold section,
positioning an upper core within each of the at least two upper mold cavities, wherein each said upper cavity portion includes a flat surface near the uppermost portion of the upper cavity;
positioning a lower core within each of the at least two lower mold cavities, wherein the lower core and upper are asymmetrical
injecting plastic into the plurality of mold cavities, wherein a needle valve hot runner system is used to inject plastic into the mold cavities,
molding a plurality of weighing funnels, wherein each weighing funnel includes an upwarding facing flat surface
moving the upper mold section upward and the lower mold section downward thereby separating the upper mold section and lower mold section,
retracting each of the at least two lower cores to release the plurality of weighing funnels from the lower cores while each of the plurality of weighing funnels remains positioned on said upper core, wherein the lower core is operatively connected to a pulling mechanism that facilitates movement of the lower core relative to the interior of the mold cavity, and
removing each weighing funnel from said upper core using a robotic arm, wherein the robotic arm includes suction cups positioned on said flat upper surface of said weighing funnel.

9. The method of claim 8 wherein the moving of said upper mold section upward, the moving of said lower mold section downward, and retracting of said lower cores happen simultaneously.

10. The method of claim 8 wherein said lower mold section includes at least two guides holes, wherein each guide hole is configured to receive a sliding bar, wherein lower mold section is movable along a vertical axis defined by the sliding bars in a direction towards or away from upper mold section.

11. The method of claim 10 wherein the upper core and lower core are connected to a support positioned between the upper mold section and lower mold section; a plurality of biasing springs positioned between said support and lower mold section, whereby movement of the lower mold section in downward direction releases said plurality of springs, resulting in the molded weighing funnel separating from the lower mold cavity.

* * * * *